Patented June 20, 1944

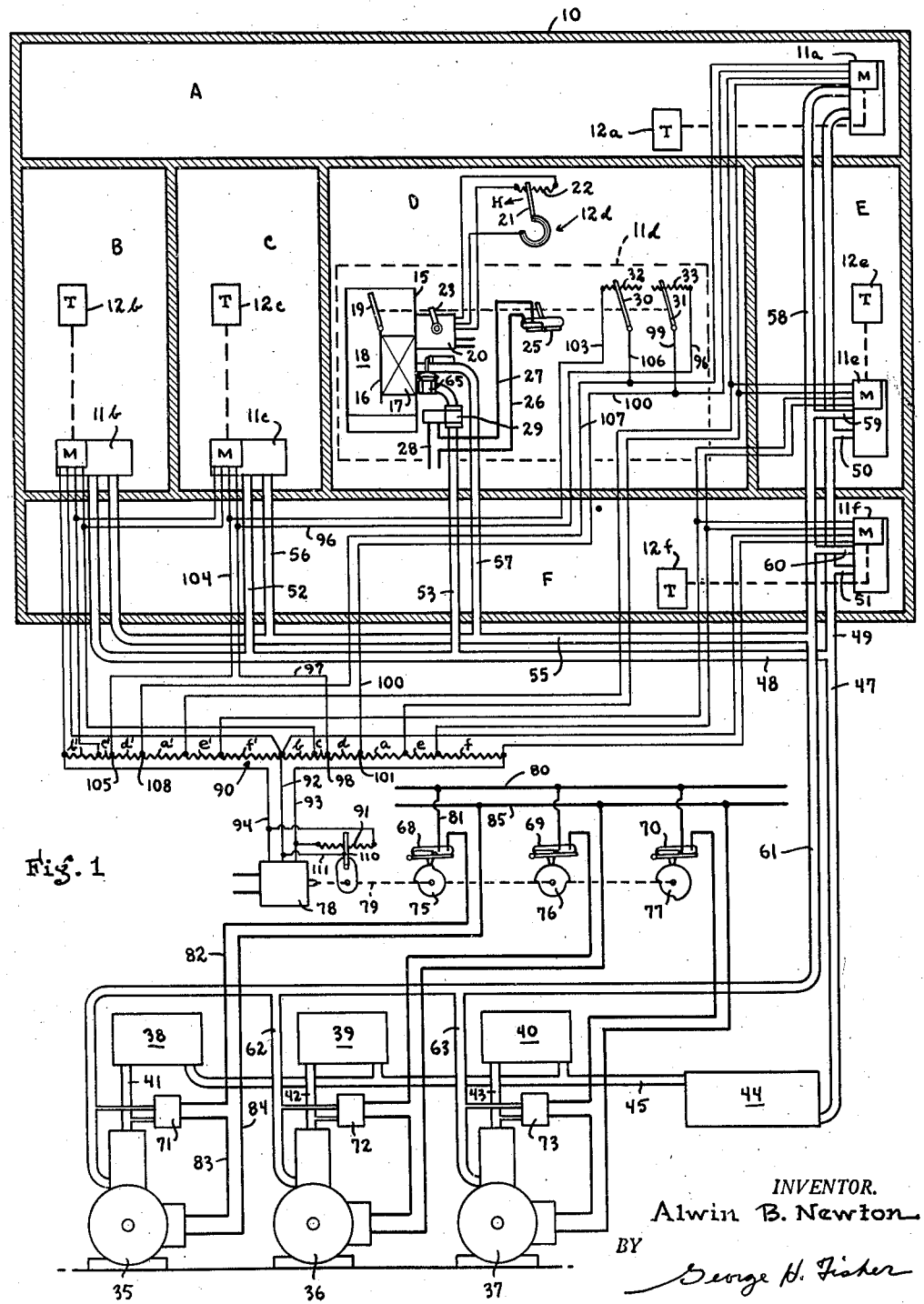

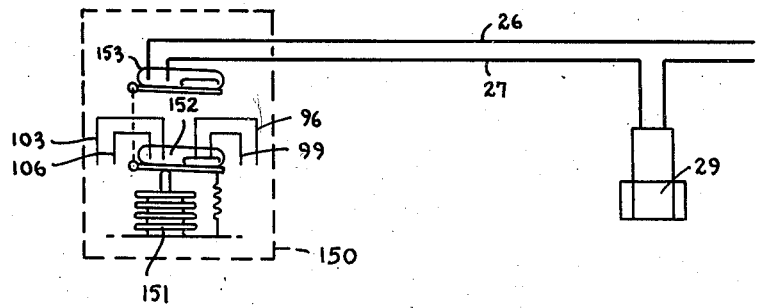
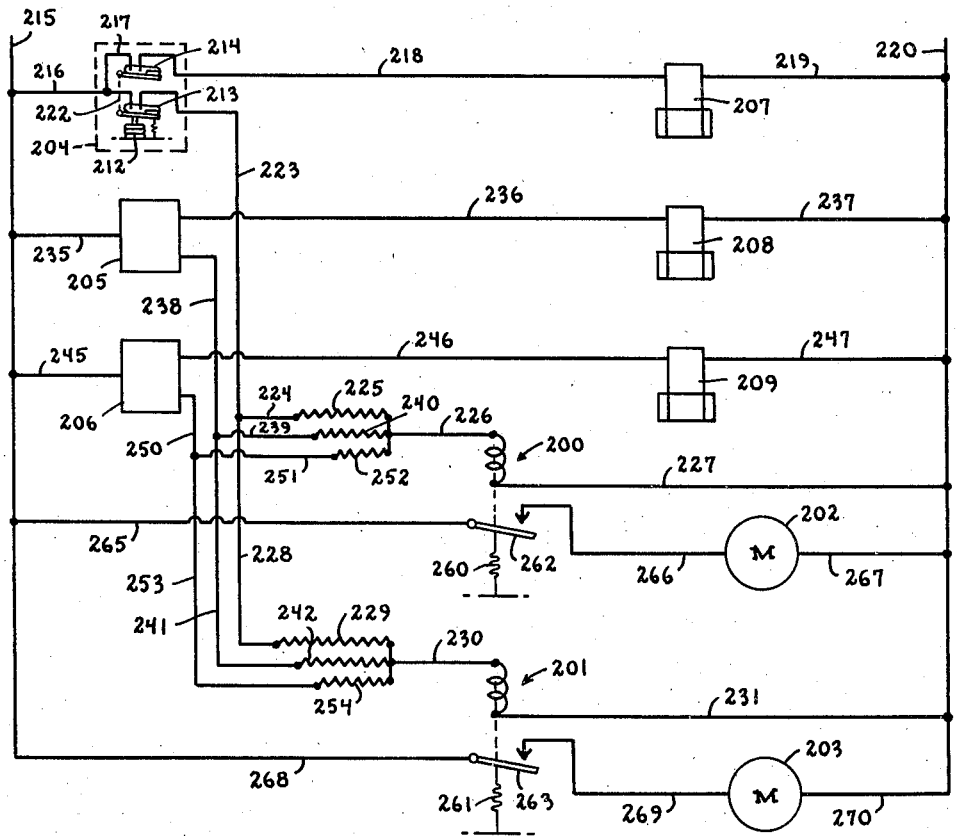

2,351,695

UNITED STATES PATENT OFFICE 2,351,695

MULTIZONE AIR CONDITIONING SYSTEM

Alwin B. Newton, Minneapolis, Minn., assignor to Minneapolis-Honeywell Regulator Company, Minneapolis, Minn., a corporation of Delaware Application April 17, 1942, Serial No. 439,381

10 Claims. (Cl. 62—6)

The present invention is directed broadly to an automatic control system for air conditioning a plurality of zones, and is more particularly directed to a system in which the air in these zones is cooled by a direct expansion refrigeration system which is fed by a variable capacity compressor arrangement in which the capacity is varied in accordance with the demand for cooling by the several zones.

One of the principal objects of this invention is to provide thermostatic means for measuring the total load on the entire system and to prevent operation of the compressor means until this load reaches a certain definite percentage of the maximum load, this percentage being such that the compressor means may operate efficiently at minimum capacity without short cycling. The invention further contemplates increasing the capacity of the compressor means as the load on the system increases to a maximum.

This control system lends itself to the control of a plurality of zones or spaces wherein the various spaces represent different loads on the system. Electrical means are provided for controlling the variable capacity compressor means and the electrical means are affected by the temperature responsive means in the various spaces in accordance with the load which that particular space represents.

A further object of the invention is to make the electrical device in the form of a proportioning motor having a control potentiometer in which variable portions of the control potentiometer are shunted by thermostatic means in the spaces to be conditioned.

Still another object of the invention is to make the electrical device in the form of a plurality of current responsive relays, the current through these relays being varied by thermostatic devices located in the spaces to be conditioned.

These and other objects will readily become apparent as the following specification is read in the light of the accompanying drawings, in which Figure 1 is a diagrammatic illustration of a control system embodying the various features of my invention, Figure 2 is a view showing a modified form of thermostatic control device which may be utilized in the various spaces, and Figure 3 is a diagrammatic representation of a modified form of my invention.

In Figure 1 of the drawings a building 10, which may be a cold storage building, is shown sectionally in plan view and comprises six zones or cold storage rooms as indicated at A, B, C, D, E, and F. In cold storage buildings of this type it is quite usual to maintain the various rooms at different temperatures and these rooms are also usually of different sizes. It therefore follows that each of these rooms represents a different percentage of the total load on the entire system. Merely by way of example, let it be assumed that room A is to be maintained at 55°, B at 45°, C at 40°, D at 35°, E at 35° and F at 40°. Also, let it be assumed that room A represents 20% of the total load on the entire system, B 15%, C 5%, D 15%, E 15% and F 30%. It is obvious that a proper control would not be effected by permitting the temperature in each of these spaces to have an equal effect upon the capacity on the compressor means. The purpose of this invention therefore, is to correlate the controls for the various spaces so that each will affect the capacity of the system in accordance with the percentage of total load on the system which it represents.

Each of these spaces is provided with an evaporator and control unit therefor as shown at 11a, 11b, 11c, 11d, 11e, and 11f. These units are of a size depending upon which space they are in, and they are under the control of individual space thermostats as shown at 12a, 12b, 12c, 12d, 12e and 12f. Inasmuch as all of the control units and thermostats therefor are the same for each space, only one of these units will be described in detail. This unit is shown as 11d in the space D.

Unit 11d is shown as comprising an air conditioning chamber 15 through which space air may be circulated by means of a fan, not shown. The chamber 15 is provided with a partition 16 which forms in effect a first conduit in which the refrigerant evaporator 17 is located and a second by-pass conduit 18. The relative proportions of air flowing across the evaporator and through the by-pass is controlled by means of the splitter damper 19. The splitter damper 19 is controlled by means of the electric proportioning motor 20 which in turn is positioned by the space thermostat 12d which moves the slider 21 over the resistance 22 in accordance with the temperature in the space D. The arrangement is such that the damper 19, under the influence of the motor 20, will take a position corresponding to the position of the slider 21 on the resistance 22. Proportioning systems of this type are well known in the prior art, and if desired may take the form shown in the patent to D. G. Taylor, 2,028,110 which issued January 14, 1936. The electrical circuits are so arranged that when the temperature in the space D is relatively low the slider 21 will take a position at the right hand end of the resistance 22 and the splitter damper 19 will therefore cause substantially all of the air to by-pass the evaporator 17. The slider 21 will be moved to the left across the resistance 22 as the temperature in the space increases and the damper 19 will therefore move correspondingly toward the left to cause more and more of the air from the space to pass over the evaporator 19 and be cooled thereby.

The proportioning motor 20, through its crank arm 23, is adapted also to actuate the mercury switch 25 in such a manner that when the slider arm 21 is at the right hand end of the resistance 22 the crank arm 23 will be in a position to maintain the mercury switch 25 in open circuit position, but as soon as the slider arm 21 moves slightly toward the left from its right hand position, the crank arm 23 will move mercury switch 25 to closed circuit position. The mercury switch 25 controls a circuit through conductors 26, 27 and 28 to the electrically operated valve 29 located in the inlet to the evaporator 17. As long as the temperature in the space D is relatively low and the slider arm 21 has moved to its right hand position wherein the splitter damper 19 is causing substantially all of the air to by-pass the evaporator 17, there is no need for the evaporator to be in operation, so under these conditions the mercury switch 25 is in open circuit position and the valve 29 in the inlet to the evaporator is closed. However, as soon as there is need for cooling in the space D as indicated by the movement of the slider arm 21 toward the left on the resistance 22, the splitter damper 19 will be moved toward the left to permit a certain amount of air to flow across the evaporator 17 and the mercury switch 25 will be moved to closed circuit position to energize the solenoid valve 29 and permit a flow of liquid refrigerant to the evaporator 17. In addition, the crank arm 23 of the proportioning motor 20 causes a movement of the two slider arms 30 and 31 with respect to the resistances 32 and 33. The function of these two slider arms and their resistances in the control system, will be described in detail later on.

The evaporators in the various spaces are supplied with liquid refrigerant by means of three compressors indicated at 35, 36 and 37. The hot compressed refrigerant is delivered to condensers 38, 39 and 40 by means of conduits 41, 42 and 43 respectively, and a common conduit 45 conducts the condenser refrigerant to the receiver 44. Supply line 47 which is connected to the receiver 44 is provided with two main branches 48 and 49, branch 49 feeding the evaporators in spaces A, E and F, and branch 48 feeding the evaporators in spaces B, C and D. The evaporators in spaces E and F are connected to the supply branch 49 by means of conduits 50 and 51 respectively, and the evaporators in spaces C and D are connected to the supply branch 48 by means of conduits 52 and 53 respectively. The expanded refrigerant from the evaporators in the spaces B, C and D flows into a branch suction line 55, the evaporator in space B connecting directly with this branch and the evaporators in C and D connecting therewith by means of the conduits 56 and 57 respectively. The expanded refrigerant from the evaporator in space A feeds directly into the branch suction line 58 and refrigerant from the evaporators in spaces E and F connect therewith by means of the conduits 59 and 60 respectively. The two branch suction lines 55 and 58 connect with the main suction line 61 which feeds directly into the compressor 35 and into the compressors 36 and 37 by means of the suction lines 62 and 63 respectively.

It will thus be seen that the three compressors and the six evaporators are all connected together to form a common direct expansion system having a common receiver 44 and common supply and suction lines 47 and 61. Moreover, the evaporator in each of the spaces is provided with a solenoid valve such as the valve 29 in space D for stopping the flow of refrigerant to the evaporator in the event that the temperature in the space is sufficiently low and for permitting such flow when there is a demand for cooling in the space. Also, each of the evaporators is provided with the usual expansion valve 65 for maintaining a constant degree of superheat at the outlet of the evaporator.

The three compressors 35, 36 and 37 are controlled respectively by means of the mercury switches 68, 69 and 70. Also, each of the compressors is provided with a usual form of safety device which deenergizes the compressor upon an abnormally high discharge pressure or an abnormally low suction pressure indicating an improper operation of the system. These safety devices are indicated at 71, 72, and 73 and are in the form of switches. The mercury switches 68, 69 and 70 are controlled respectively by means of the cams 75, 76 and 77 which are rotated by the proportioning motor 78. As shown in Figure 1, the mercury switches are all in open circuit position and therefore, each of the compressors is deenergized. Upon a rotation of the shaft, indicated by the dotted lines 79, in a clockwise direction, the low side of the cam 75 will be brought adjacent the mercury switch 68 which will then move to closed circuit position. This will establish an energizing circuit for the compressor 35 from one line wire 80 through conductor 81, mercury switch 68, conductor 82, switch 71, conductor 83, compressor 35, and conductor 84 back to the other line wire 85. Further rotation of the shaft 79 in a clockwise direction will cause the low side of the cam 76 to be brought opposite the mercury switch 69 and permit it to move to closed circuit position. Closure of switch 69 will energize the compressor 36 by a circuit similar to the one traced in connection with compressor 35. A further rotation of the shaft 79 in a clockwise direction will cause the low side of cam 77 to be positioned adjacent the mercury switch 70 and this switch will then move to closed circuit position and energize the compressor 37 in the same manner that the other switches energized the compressors 35 and 36. It will therefore be seen that one, two, three or none of the compressors will be energized depending upon the position of the shaft 79.

The proportioning motor 78 is provided with a control potentiometer indicated generally at 90 and a follow-up or rebalancing potentiometer indicated at 91. The operation of proportioning motors of the follow up type are old and well known in the art and may take the form of the proportioning motor system shown in the Taylor patent, 2,028,110, referred to above. The electrical proportioning system for the motor 78 may be exactly like that shown in the Taylor patent with the exception of the manner in which the amount of resistance in each side of the control potentiometer 90 is varied. In order to effect rotation of the motor 78 the resistance present in the control potentiometer 90 between the common wire 92 and the wires 93 and 94 must be varied. It is customary to accomplish this by connecting the common wire 92 to a slider arm which slides over the control potentiometer 90 to thereby vary the amount of resistance in each side. In the present system, however, each side of the control potentiometer is tapped at various points and these points are connected to resistance elements such as the elements 32 and 33 shown in space D so that when these resistance elements are cut in or cut out of the shunt circuit the effective resistances of the two sides of the potentiometer coil are varied. For example, the right hand end of the resistance 33 is connected by conductors 96 and 97 to the tap 98 in the right hand side of the control potentiometer 90. The slider 31 which cooperates with resistance 33 is connected by means of conductors 99 and 100 to the tap 101 in the right hand side of the control potentiometer 90. The resistance between these two taps has been designated as $d$. Thus, it will be seen that the resistance 33 is electrically connected in parallel with portion $d$ of the control potentiometer resistance which lies between the two taps 98 and 101. Thus, with the slider arm 31 on the left hand side of the resistance 33 the effective resistance of portion $d$ of potentiometer 90 between the taps 98 and 101 depends upon the value of resistance of that portion of the potentiometer coil and the resistance 33, connected in parallel. However, as the slider 31 moves towards the right on resistance 33 the resistance of the shunt path is decreased and therefore, the effective resistance of the right hand portion of the potentiometer 90 is correspondingly decreased.

The left hand end of resistance 32 is connected by conductors 103 and 104 to the tap 105 on the left hand side of the control potentiometer 90 and the slider arm 30 which cooperates with this resistance is connected by conductors 106 and 107 to the tap 108 on the left hand side of the control potentiometer. That portion of the control potentiometer between these two taps has been indicated as $d'$ and is of the same size as $d$ on the right hand side of the control potentiometer. It will be noted that the resistance 32 is connected in shunt with $d'$ on the left hand side of the control potentiometer in the same manner that the resistance 33 is connected in shunt with $d$ on the right hand side of the potentiometer. As the proportioning motor 20 in the space D rotates the crank arm 23 in a counterclockwise direction, the slider arms 30 and 31 will be simultaneously moved across their respective resistances 32 and 33. Such movement will cause the slider arm 31 to gradually cut in the resistance 33 at the same time as the slider arm 30 cuts out the resistance 32. In other words, the slider arm 31 is increasing the resistance in the shunt path around the portion $d$ on the right hand side of the control potentiometer, whereas the slider arm 30 is decreasing the resistance of the shunt path around the portion $d'$ in the left hand side of the potentiometer. This has the effect, therefore, of increasing the resistance of the right hand portion of the control potentiometer and decreasing the resistance of the left hand portion, or in other words, has the same effect as if a slider connected to the common wire 92 were moving to the left across the control potentiometer 90.

Similarly, the control unit 11a in space A is adapted to variably control shunt circuits around the portion $a$ on the right hand and $a'$ on the left hand half of the control potentiometer 90. Control 11b variably controls shunt circuits around portions $b$ and $b'$, control unit 11c variably controls shunt circuits around portions $c$ and $c'$, control unit 11e variably controls shunt circuits around portions $e$ and $e'$, and control unit 11f variably controls shunt circuits around portions $f$ and $f'$. The effect of all of these circuits is to vary the effective resistance between the common wire 92 and the two outside wires 93 and 94 for the purpose of variably positioning the proportioning motor 78 in accordance with the total demand for cooling as measured by the temperatures in each of the spaces. In order that the proportioning motor 78 may be properly positioned it operates the usual follow up slider arm 110 through a gear reduction, not shown. The slider 110 cooperates with the rebalancing resistance 91 and is electrically connected to the common wire 92 by means of conductor 111. Thus, the proportioning system for the motor 78 is similar in all respects to that shown in the above mentioned Taylor patent, 2,028,110, with the exception of the specific manner in which the effective resistance of the control potentiometer 90 is varied.

The main purpose of this control system is to vary the capacity in accordance with the demand for cooling. However, it is desired that all of the compressors should remain inoperative until the demand for cooling reaches at least a certain percentage of the total demand. The purpose for this is that if one of the compressors were energized when the demand for cooling were extremely low, then the capacity would be far in excess of that required, with the result that the compressor would produce a very low suction pressure and the evaporator coil or coils which were in operation would be at a very low temperature so that not only would the system be operating inefficiently but the very low temperature in the evaporator coil would cause undesirable dehumidification of the air in the spaces in which these coils were located and a resultant drying out of the material therein. For this reason the control circuits are so set up that the thermostats in the various spaces will indicate a demand of approximately 25% of the total maximum load before the proportioning motor 78 will have moved far enough to cause closure of the mercury switch 63.

Considering the operation of the system as a whole when the temperature in each of the spaces is sufficiently low all of the thermostatically operated sliders corresponding to the slider 21 in space D will have moved to the right hand end of their resistances 22, the splitter dampers 19 will all be by-passing all of the air around the evaporator 17 and the sliders 30 and 31 will be moved to the right hand end of their respective resistances. The mercury switches 25 will all be in open circuit position at which time the solenoid valves 29 will be closed, thereby preventing the flow of refrigerant to the evaporators 17. In view of the fact that the sliders 30 and 31 are at the right hand end of their resistances all of the resistance between the common wire 92 and the wire 93 will have been shunted whereas all of the resistance between the common wire 92 and wire 94 will be effective along with the relatively large amount of resistance in parallel therewith. In other words, the resistance between the common wire 92 and wire 93 will be substantially zero whereas there will be a relatively large resistance between the common wire 92 and the wire 94. Under these circumstances the proportioning motor 78 will have rotated to a position where the slider 110 will be at the right hand end of the rebalancing resistance 91 at which time the mercury switches 68, 69 and 70 will be supported by the high portion of the cam 75, 76, and 77 and all of these switches will therefore be in open circuit position. Thus, the entire system will be deenergized when all of the spaces are sufficiently cool.

If the temperature in one of the spaces, space D for example, should increase then the slider 21 will start to move to the left over the resistance 22 and cause a corresponding movement of proportioning motor 20. Motor 20 will cause a counter-clockwise rotation of the crank arm 23 thereby causing the splitter damper 19 to permit a slight amount of air to flow across the evaporator 17. Movement of the crank arm 23 will also close mercury switch 25 to open the valve 29 to permit flow of refrigerant to the evaporator 17. Also the movement of the crank arm 23 will cause a movement of the slider arms 30 and 31 toward the left which will in effect add resistance to the potentiometer 90 between the taps 98 and 101 and decrease the resistance between the taps 105 and 108. This in effect, adds resistance between the common wire 92 and the wire 93 and removes resistance between the common wire 92 and the wire 94. Thus, the electrical system becomes unbalanced and the proportioning motor 78 rotates in a direction to cause the slider arm 110 to move toward the left to remove resistance between the wires 92 and 93 and add resistance between the wires 92 and 94. When the system has been rebalanced by the slider arm 110 the proportioning motor 78 will stop.

It will be noted that the size of the sections $a$, $b$, $c$, $d$, $e$, and $f$, and $a'$, $b'$, $c'$, $d'$, $e'$, and $f'$ of the control potentiometer 90 bear a direct relationship to the percent of total load which the corresponding spaces represent. Thus, space A represents 20% of the total load on the entire system and therefore, the two portions $a$ and $a'$ on the control potentiometer comprise 20% of the total potentiometer resistance. Likewise, space B represents 15% of the total load on the system and the two portions $b$ and $b'$ represent 15% of the total control potentiometer, etc. Thus, even though the temperature in the space D reaches a maximum value, the demand for cooling would still be only 15% of the maximum cooling demand possible, assuming of course that all of the other spaces were satisfied. The cam 75 controlled by the proportioning motor 78 has been so set on the shaft 79 that the mercury switch 68 will not be closed until there is at least a 25% demand for cooling and therefore, the space D by itself is incapable of causing operation of any of the compressors. However, in the normal operation of the system it is very unlikely that one space will be calling for a maximum amount of cooling while the same time all of the other spaces remain satisfied. It will be clear, therefore, that the temperature in each space will have its own individual effect upon the effective resistances in each side of the control potentiometer with the result that the proportioning motor 78 will be positioned in accordance with the total demand for cooling as indicated by the temperature in all of the spaces.

As soon as the total demand for cooling reaches 25% the proportioning motor 78 will have rotated far enough for the cam 75 to permit closing of the mercury switch 68, and this switch will energize the compressor 35 by means of the circuit traced above. In order to prevent short cycling of the compressor, the mercury switch 68 has been provided with a slight hump in the middle of the tube in order that it will have a slight differential so that the demand for cooling will have to decrease approximately 5% before the motor 78 will have rotated in a reverse direction far enough to cause opening of the mercury switch 68. In other words, the mercury switch 68 will close upon a 25% demand for cooling and will reopen when this demand has been reduced to approximately 20%. It will be clear that as the demand for cooling increases the proportioning motor 78 will be rotated farther and farther until, when the demand reaches approximately 50%, the mercury switch 69 will be closed and the compressor 36 energized. If the operation of the two compressors is still insufficient to maintain the proper temperature within the spaces then the temperature therein will continue to rise and the proportioning motor 78 will be rotated until the cam 77 permits closing of the mercury switch 70 at which time the compressor 37 will be energized. The system will now be operating at maximum capacity. It will be clear, of course, that when the temperatures in the various spaces begin to fall, the reverse operation will take place with the compressor 37 being deenergized first, then the compressor 36, and finally when the demand falls to 20% of maximum demand the compressor 35 will be deenergized.

In some instances it may be desirable to substitute a direct on and off control for the proportioning control in the various spaces. In other words, it may be desirable to shunt each of the various portions $a$ to $f$ and $a'$ to $f'$ of the control potentiometer 90 in one step by means of a switch or to entirely break the shunt circuit around these portions. If such an operation is desirable then a control instrument such as the one disclosed at 150 in Figure 2 may be used. This instrument comprises a temperature responsive bellows 151 which is adapted to rotate a pair of mercury switches 152 and 153 in a counter-clockwise direction upon an increase in temperature. The mercury switch 152 is a double-ended switch with the electrodes in the right hand end of the switch being bridged when the temperature in the space is below a predetermined value, and the electrodes in the left hand end of the switch being bridged when the temperature is above such predetermined value. The electrodes in the right hand end of the switch may be connected directly to conductors 96 and 99 shown in space D in Fig. 1 at which time the portion $d$ in the right hand half of the control potentiometer 90 will be shunted. The electrodes in the left hand end of the switch may be connected directly to conductors 103 and 106 also shown in space D in Figure 1 by which are connected across portion $d'$ in the left hand end of the control potentiometer 90. With the bellows 151 in the position shown in Figure 2 the shunt across portion $d'$ in the left hand side of the control potentiometer will be open so that the resistance between the taps 105 and 108 will be completely effective. Upon an increase in temperature the mercury switch 152 will rotate in a counter-clockwise direction to cause unbridging of the conductors 96 and 99 and the bridging of the conductors 103 and 106. This will in effect cut the resistance of portion $d'$ out of the left hand side of the control potentiometer and insert it into the right hand portion of the potentiometer. In other words, the control device of Figure 2 accomplishes in one step what the control device of Figure 1 with its slider arms 30 and 31 accomplish gradually upon changes in temperature. The mercury switch 153 shown in Figure 2 controls the circuit to the solenoid valve 29 and hence, performs the same function as the mercury switch 25 shown in space D of Figure 1.

It is possible for all of the spaces to be provided with a control device as shown in Figure 2, or if desired, some of them may be provided with the control device in Figure 1 whereas the remaining may be provided with the control device shown in Figure 2.

Figure 3 discloses a modified form of my invention in which the current responsive relays 200 and 201 are utilized for controlling the compressors 202 and 203. This control system has been shown in combination with three thermostatic switches indicated at 204, 205 and 206, each of which is intended to be located in a separate space in which evaporators are located which are intended to be fed with liquid refrigerant by the compressors 202 and 203 in the same manner as disclosed in Figure 1. The solenoid valve 207 is adapted to control the flow of refrigerant to the evaporator in the space in which the thermostatic switch 204 is located, the solenoid valve 208 is adapted to control the flow of refrigerant to the evaporator in the space in which the thermostatic switch 205 is located, and the solenoid valve 209 is adapted to control the flow of refrigerant to the evaporator in the space in which the thermostatic switch 206 is located.

The thermostatic switches 204, 205 and 206 are identical and therefore, only 204 will be described in detail. The thermostatic switch 204 comprises a bellows 212 which is adapted to operate the two mercury switches 213 and 214. The bellows 212 is a thermostatic bellows responsive to the temperature in the space and is shown in the position which it will occupy when the temperature in the space is at or below the desired value, at which time the two mercury switches 213 and 214 are in open circuit position. Upon an increase in temperature in the space in which the bellows 212 is located, the bellows will expand and when the temperature increases above the desired value it will rotate the mercury switches in a counter-clockwise direction, thereby moving them to closed circuit position. Upon closure of mercury switch 214 a circuit will be established from the line wire 215 through conductors 216, 217, mercury switch 214, conductor 218, solenoid valve 207, and conductor 219 back to the other line wire 220. This will result in the energization of the solenoid valve 207 at which time it will permit the flow of refrigerant to the evaporator within the space, providing liquid refrigerant is available at the time. The mercury switch 213 will be closed at the same time as the switch 214 and a second circuit will be established from the line wire 215 through conductors 216, 222, mercury switch 213, conductors 223 and 224, resistance element 225, conductor 226, current responsive relay 200 and conductor 227 back to the other line wire 220. A parallel circuit will be established from the conductor 223 through conductor 228, resistance element 229, conductor 230, relay 201 and conductor 231 to the line wire 220.

The thermostatic switch 205 is also provided with a pair of mercury switches such as those disclosed in the thermostatic switch 204 and when the temperature in the space in which the thermostatic switch 205 is located rises above a desired value, a circuit is established from the line wire 215 through conductor 235, thermostatic switch 205, conductor 236, solenoid valve 208 and conductor 237 back to line wire 220. An additional circuit is likewise closed through conductors 238 and 239 and through resistance element 240 to conductor 226 and then through the relay 200 and conductor 227 to the line wire 220. A parallel circuit extends from the conductor 238 through conductor 241, resistance element 242, conductor 230, relay 201, and conductor 231 to line wire 220. Likewise, the thermostatic switch 206, which is located in the third space, is adapted to establish a circuit from the line wire 215 through conductor 245, conductor 246, solenoid valve 209 and conductor 247 to line wire 220. At the same time a circuit is set up from line wire 215, conductor 245, thermostatic switch 206, through conductor 250, conductor 251, resistance element 252 to conductor 226, relay 200 and conductor 227 back to line wire 220. A parallel circuit extends from conductor 250 through conductor 253 and resistance element 254, conductor 230, relay 201 and conductor 231 back to the line wire 220.

As in the system shown in Figure 1, the various thermostatic switches 204, 205 and 206 may be located in spaces which represent different loads upon the system. Thus, the space in which the thermostatic switch 204 is located may represent a relatively small percentage of the total load, the space in which the thermostatic switch 205 is located may represent a larger percentage, and the space in which the thermostatic switch 206 is located may represent an even larger percentage.

It may not be desirable to energize either of the compressors in the event that the thermostatic switch 204 is the only one calling for cooling. Therefore, if this switch is moved to closed position the solenoid valve 207 is opened and a circuit is established through the resistance element 225 and through the relay 200 and also through the resistance 229 and relay 201. The two resistance elements 225 and 229 are relatively large and therefore, may permit only a relatively small amount of current to flow through the relays 200 and 201. The relays are biased to open circuit position by the biasing springs 260 and 261 and these springs prevent the relays from pulling in their armatures 262 and 263 respectively when the only current flowing through the relays is that which passes through the resistance elements 225 and 229. Thus, when the thermostatic switch 204 is the only one calling for cooling, neither of the compressors is energized.

Similarly, if the thermostatic switch 205 is the only one which is calling for cooling, all of the current which passes through the relay 200 must pass through the resistance element 240 and all of the current which passes through the relay 201 must pass through the resistance element 242. Here again, the biasing spring 260 and 261 may be so selected that they will prevent either of the relays from pulling in at this current value, and therefore, neither of the compressors is energized. However, when only the thermostatic switch 206 is calling for cooling, the current flow through the relay 200 passes through the relatively small resistance 252, and likewise, the current passing through the relay 201 passes through the small resistance 264. The biasing spring 260 is so chosen that the current flow through the resistance 252 is sufficiently large to cause the relay 200 to pull in its armature 262 thereby establishing a circuit from the line wire 215 through conductor 265, armature 262, conductor 266, compressor 202 and conductor 267 back to the other line wire 220. Thus, the thermostatic switch 206 is capable of energizing the compressor 202 upon a call for cooling. It will be noted, however, that the resistance 254 is larger than the resistance 252, and is in fact, so large that the current flow through the relay 201 is insufficient to cause it to pull in its armature. Therefore the compressor 203 remains deenergized at this time. If the thermostatic switch 205 should call for cooling at this time a circuit is set up through the resistance 242 and this current added to the priority flowing through the relay 201 is sufficient to cause this relay to pull in its armature 263 at which time the compressor 203 is energized from a circuit extending from the line wire 215 to conductor 268, armature 263, conductor 269, compressor 203, and conductor 270 back to the other line wire 220. The system is therefore now operating at maximum capacity even though the thermostatic switch 204 is still satisfied.

Preferably the resistances and relays are so chosen in this embodiment of my invention that neither the thermostatic switch 204 nor 205 alone can start either of the compressors. The thermostatic switch 206, however, alone is operative to start the compressor 202 but not the compressor 203. If both the thermostatic switches 204 and 205 are calling for cooling they can start the compressor 202 but not the compressor 203. However, if the thermostatic switches 205 and 206 together call for cooling, they can start both the compressors but the thermostatic switches 206 and 204 together can only start the compressor 202.

The above relationship is given for purposes of illustration only. It is obvious that more compressors may be used and also that these compressors may operate to cool any number of spaces, each space having an individual thermostatic switch and controlling the flow of current to resistances which are inversely proportional to the load on the system which that particular space represents. In other words, the smaller the load represented by the space, the larger the resistance controlled thereby, and hence the smaller the value of current which will be permitted to flow to the relay. It will also be obvious to those skilled in the art, that a thermostat operating a variable resistance may be substituted for the bellows 212 and mercury switch 213 in any or all of the spaces. This would give a more or less graduating control of the current flow through the relays 201, and would perhaps give a more accurate indication of the total load on the system than the mercury switch arrangement as disclosed.

Many other changes and modifications of the above system will undoubtedly occur to those who are skilled in the art, and it is therefore my intention to be limited only by the scope of the appended claims and not by the specific embodiments of this invention which has been disclosed herein.

I claim as my invention:

1. In an air conditioning system for a plurality of spaces representing unequal loads on said system, in combination, evaporator means for each space, variable capacity compressor means for supplying liquid refrigerant to said evaporator means, a variable position control device for varying the capacity of said compressor means, said compressor means being inoperative as said control device moves from a first position to an intermediate position at which time said compressor means operates at minimum capacity, said capacity being increased as said control device moves from said intermediate position to a final position, a temperature responsive device in each of said spaces, and connections by means of which each temperature responsive device moves said control device an amount dependent both upon the percentage of the total load on the system which that particular space represents and the amount the temperature in such space has deviated from the temperature it is desired to maintain therein.

2. In an air conditioning system for a plurality of spaces representing unequal loads on said system, in combination, evaporator means for each space, variable capacity compressor means for supplying liquid refrigerant to said evaporator means, a temperature responsive device in each of said spaces, electric circuit means, means operated by each temperature responsive device for changing a condition of said circuit means an amount dependent both upon the load represented by the space in which that particular temperature responsive device is located and in accordance with the amount the temperature in said space has deviated from the desired value, and means responsive to the condition of said electric circuit means for rendering said compressor means operative at minimum capacity when the condition of said circuit indicates a sufficient demand to warrant such operation, and for increasing said capacity upon an increase in said demand.

3. In an air conditioning system for a plurality of spaces representing unequal loads on said system, in combination, evaporator means for each space, variable capacity compressor means for supplying liquid refrigerant to said evaporator means, a temperature responsive device in each of said spaces, electric circuit means, means operated by each temperature responsive device for changing a condition of said circuit means an amount dependent upon the load represented by the space in which that particular temperature responsive device is located, and means responsive to the condition of said electric circuit means for rendering said compressor means operative at minimum capacity when the condition of said circuit indicates a sufficient demand to warrant such operation and for increasing said capacity upon an increase in said demand, at least one of said spaces representing such a small load that its temperature responsive device is incapable of changing the condition of said circuit means sufficiently to cause operation of said compressor if no other space is demanding such operation.

4. In an air conditioning system for a plurality of spaces, in combination, evaporator means for each space, variable capacity compressor means for supplying liquid refrigerant to said evaporator means, a temperature responsive device in each of said spaces, electric circuit means, proportioning means operated by each temperature responsive device for varying a condition of said circuit means in proportion to the deviation in temperature in each space, and means responsive to the condition of said electric circuit means for rendering said compressor means operative at minimum capacity when the condition of said circuit indicates a sufficient demand to warrant such operation, and for increasing said capacity upon an increase in said demand.

5. In an air conditioning system for a plurality of spaces representing unequal loads on said system, in combination, evaporator means for each space, variable capacity compressor means for supplying liquid refrigerant to said evaporator means, a temperature responsive device in each of said spaces, electric circuit means, means operated by each temperature responsive device for changing the value of current flowing through said circuit means, the effect of said current changing means upon the current in said circuit means being dependent upon the load represented by the space in which the corresponding temperature responsive device is located, a plurality of relays each requiring a different current value to operatively energize the same in control of said variable capacity compressor means, a first of said relays responding to a first value of current in said electric current means to render said compressor means operative at minimum capacity, said first current value corresponding to a sufficient demand to warrant compressor operation, the remainder of said relays responding to an increase in said current value to increase the capacity of said compressor means.

6. In an air conditioning system for a plurality of spaces representing unequal loads on said system, in combination, evaporator means for each space, variable capacity compressor means for supplying liquid refrigerant to said evaporator means, a thermostatic switch for each space, a plurality of current responsive relays for controlling said compressor means, and separate resistance means in series with each of said thermostatic switches and each of said current responsive relays, said resistance means being of such a size that the closure of any thermostatic switch will cause an increase in current through said relays, said current increase being proportional to the load represented by the space to which that particular thermostatic switch corresponds, a first of said relays responding to a first value of current to render said compressor means operative at minimum capacity, said first current value corresponding to a sufficient demand to warrant compressor operation, the remainder of said relays responding to an increase in said current value to increase the capacity of said compressor means.

7. In an air conditioning system for a plurality of spaces representing unequal loads on said system, in combination, evaporator means for each space, variable capacity compressor means for supplying liquid refrigerant to said evaporator means, an electrically operable device for varying the capacity of said compressor means, means including an electrical balancing system for positioning said device, said electrical balancing system having a control potentiometer for unbalancing the same and a rebalancing potentiometer for rebalancing the same, the thermostats responsive to the temperature in each of said spaces, resistance means for each thermostat, each thermostat varying said resistance means in accordance with the space temperature to which it responds, each of said resistance means being connected in shunt with a portion of said control potentiometer, said portion being proportional in size to the load represented by the corresponding space, driving connections between said rebalancing potentiometer and said device whereby said device is positioned in accordance with the load on the entire system as determined by said thermostats, means operated by said device for preventing operation of said compressor means until the demand for operation is such as to correspond substantially to the minimum capacity of said compressor means, and means operated by said device for increasing said capacity upon an increase in the demand.

8. In an air conditioning system for a plurality of spaces representing unequal loads on said system, in combination, evaporator means for each space, variable capacity compressor means for supplying liquid refrigerant to said evaporator means, an electrically operable device for varying the capacity of said compressor means, means including an electrical balancing system for positioning said device, said electrical balancing system having a control potentiometer for unbalancing the same and a rebalancing potentiometer for rebalancing the same, thermostats responsive to the temperature in each of said spaces, resistance means for each thermostat, each thermostat varying said resistance means in accordance with the space temperature to which it responds, each of said resistance means being connected in shunt with a portion of said control potentiometer, said portion being proportional in size to the load represented by the corresponding space, driving connections between said rebalancing potentiometer and said device whereby said device is positioned in accordance with the load on the entire system as determined by said thermostats, means operated by said device for preventing operation of said compressor means until the demand for operation is such as to correspond substantially to the minimum capacity of said compressor means, means operated by said device for increasing said capacity upon an increase in the demand, and means operated by each thermostat for varying the effect of the evaporator on the air in the space to whose temperature said thermostat responds.

9. In an air conditioning system for a plurality of spaces, in combination, evaporator means for each space, variable capacity compressor means for supplying liquid refrigerant to said evaporator means, valve means for controlling the flow of refrigerant to each of said evaporator means, means for varying the effectiveness of each of said evaporator means, means responsive to the temperature in each of said spaces, means operated by each temperature responsive means for opening its associated valve means upon an initial rise in temperature and for operating its associated effectiveness varying means to increase the effectiveness of its associated evaporator as the temperature continues to rise, and means operated by all said temperature responsive means to control the capacity of said variable compressor means to increase the capacity thereof as the total demand by all said temperature responsive means increases.

10. In an air conditioning system for a plurality of spaces representing unequal loads on said system, in combination, evaporator means for each space, variable capacity compressor means for supplying liquid refrigerant to said evaporator means, a temperature responsive device in each of said spaces, electric circuit means, means operated by each temperature responsive device for changing a condition of said circuit means an amount dependent upon the load represented by the space in which that particular temperature responsive device is located, and means responsive to the condition of said electric circuit means for rendering said compressor means operative at minimum capacity when the condition of said circuit indicates a sufficient demand to warrant such operation and for increasing said capacity upon an increase in said demand, at least one of said spaces representing such a small load that its maximum demand, as determined by a full range of movement of its temperature responsive device, is less than said sufficient demand which is required to start a compressor.

ALWIN B. NEWTON.